(12) United States Patent
Ishiguro et al.

(10) Patent No.: US 11,456,460 B2
(45) Date of Patent: Sep. 27, 2022

(54) NONAQUEOUS ELECTROLYTE SECONDARY BATTERY

(71) Applicants: Panasonic Corporation, Kadoma (JP); SANYO Electric Co., Ltd., Daito (JP)

(72) Inventors: Tasuku Ishiguro, Osaka (JP); Atsushi Mizawa, Hyogo (JP)

(73) Assignees: PANASONIC HOLDINGS CORPORATION, Kadoma (JP); SANYO Electric Co., Ltd., Daito (JP)

( * ) Notice: Subject to any disclaimer, the term of this patent is extended or adjusted under 35 U.S.C. 154(b) by 394 days.

(21) Appl. No.: 16/795,147

(22) Filed: Feb. 19, 2020

(65) Prior Publication Data

US 2020/0185725 A1 Jun. 11, 2020

Related U.S. Application Data

(63) Continuation of application No. PCT/JP2018/025742, filed on Jul. 6, 2018.

(30) Foreign Application Priority Data

Sep. 29, 2017 (JP) .............................. JP2017-189366

(51) Int. Cl.
*H01M 10/0587* (2010.01)
*H01M 50/528* (2021.01)
(Continued)

(52) U.S. Cl.
CPC ............... *H01M 4/64* (2013.01); *H01M 4/13* (2013.01); *H01M 10/0431* (2013.01); *H01M 10/0587* (2013.01)

(58) Field of Classification Search
CPC ......... H01M 10/0431; H01M 10/0587; H01M 50/528; H01M 50/531; H01M 50/533;
(Continued)

(56) References Cited

U.S. PATENT DOCUMENTS 5,354,629 A 10/1994 Kuroda et al.
5,989,743 A 11/1999 Yamashita
(Continued)

FOREIGN PATENT DOCUMENTS

JP 5-101815 A 4/1993
JP 6-52867 A 2/1994
(Continued)

OTHER PUBLICATIONS

International Search Report dated Sep. 11, 2018, issued in counterpart application No. PCT/JP2018/025742 (2 pages).

*Primary Examiner* — Yoshitoshi Takeuchi
(74) *Attorney, Agent, or Firm* — WHDA, LLP

(57) ABSTRACT

A nonaqueous electrolyte secondary battery includes a negative electrode plate, a negative electrode current collector lead joined to the inner peripheral end of the negative electrode plate, and a negative electrode current collector-exposed part where a negative electrode active material layer is not formed at the outer peripheral-side end. The negative electrode current collector-exposed part at the outer peripheral end comes in contact with a battery case, and in a plane vertical to the axis of an electrode body, a line connecting the axis and the center of a positive electrode current collector lead does not coincide with a line connecting the axis and the center between the coating end of the outer peripheral-side negative electrode active material layer of the negative electrode plate and the terminal part of the outer peripheral-side positive electrode plate.

6 Claims, 2 Drawing Sheets

(51) Int. Cl.
*H01M 50/531* (2021.01)
*H01M 50/533* (2021.01)
*H01M 50/534* (2021.01)
*H01M 50/536* (2021.01)
*H01M 4/64* (2006.01)
*H01M 4/13* (2010.01)
*H01M 10/04* (2006.01)

(58) Field of Classification Search
CPC .... H01M 50/534; H01M 50/536; H01M 4/64; H01M 4/13
See application file for complete search history.

(56) References Cited

U.S. PATENT DOCUMENTS

| | | |
|---|---|---|
| 2006/0008701 A1 | 1/2006 | Kim et al. |
| 2006/0115736 A1* | 6/2006 | Hashimoto ........... H01M 4/134 |
| | | 429/246 |
| 2010/0255357 A1 | 10/2010 | Baek et al. |
| 2011/0033737 A1 | 2/2011 | Miyahisa et al. |

FOREIGN PATENT DOCUMENTS

| | | |
|---|---|---|
| JP | 8-153542 A | 6/1996 |
| JP | 2006-12813 A | 1/2006 |
| JP | 2007-128747 A | 5/2007 |
| JP | 2010-186740 A | 8/2010 |
| JP | 2010-533952 A | 10/2010 |
| JP | 2012-178237 A | 9/2012 |

\* cited by examiner

NONAQUEOUS ELECTROLYTE SECONDARY BATTERY

TECHNICAL FIELD

The present invention relates to a nonaqueous electrolyte secondary battery having a current collector structure suitable for higher capacity.

BACKGROUND ART

Nonaqueous electrolyte secondary batteries have been recently widely used as drive power supplies for portable electronic devices such as a smartphone, a tablet computer, a notebook computer, a potable music player, and the like. Applications of nonaqueous electrolyte secondary batteries are extended to an electric tool, an electric assist bicycle, an electric vehicle, and the like, and nonaqueous electrolyte secondary batteries are required to have higher output.

An electrode plate of a nonaqueous electrolyte secondary battery includes an active material layer formed on a current collector composed of a metal foil, and a portion of the electrode plate is provided with a current collector-exposed part where the active material layer is not formed on the current collector. A current collector lead is connected to the current collector-exposed part to secure a current path between the electro plate and an external terminal.

However, when current collection is performed by connecting a current collector lead of a negative electrode to the current collector-exposed part of the outermost periphery of the electrode plate, current is concentrated in one electrode lead, and thus output cannot be secured. Therefore, for example, Patent Literature 1 discloses a nonaqueous electrolyte secondary battery of high-output type in which in the electrode outermost periphery, an electrode on the outermost periphery is brought into surface contact with a case.

CITATION LIST

Patent Literature

PTL 1: Japanese Published Unexamined Patent Application No. 2007-128747

SUMMARY OF INVENTION

Technical Problem

On the other hand, in the present invention, an attempt is made to achieve higher output of a nonaqueous electrolyte secondary battery by bringing the outermost periphery of an electrode group into contact with a negative electrode and providing a negative electrode current collector lead on the inner peripheral part. Further, in order to achieve higher capacity, the diameter of the electrode body is increased. However, in order to fix the electrode body and insert the electrode body in a battery case, it is necessary to wind a wrap tape around an upper part and a lower part of an electrode group. Further, a crack is formed in a negative electrode mixture due to a step difference caused by the thickness of the wrap tape and due to the expansion-contraction stress of a wound electrode body, thereby causing the problem of worsening the cycle retention rate.

The present invention has been achieved in consideration of the above, and an object of the present invention is to provide a nonaqueous electrolyte secondary battery which is improved in output characteristics by electrical connection between a negative electrode current collector lead and a battery case and which suppresses a crack in a negative electrode mixture layer in the outermost periphery.

In order to solve the problem described above, a nonaqueous electrolyte secondary battery according to an aspect of the present invention includes an electrode body, which is formed by winding a negative electrode plate and a positive electrode plate through a separator and is fixed at the upper part and the lower part by a wrap tape, a nonaqueous electrolyte, a bottomed cylindrical battery case which houses the electrode body and the nonaqueous electrolyte, and a sealing body which seals an opening of the battery case.

The negative electrode plate has a first negative electrode current collector-exposed part and a second negative electrode current collector-exposed part where negative electrode active material layers are not formed at the inner peripheral side end and the outer peripheral side end, respectively, a negative electrode current collector lead is joined to the first negative electrode current collector-exposed part, and at least a part of the second negative electrode current collector-exposed part is in contact with the battery case.

The positive electrode plate has a first positive electrode current collector-exposed part where a positive electrode active material layer is not formed in at least a part on the outer peripheral side of the negative electrode current collector lead, a positive electrode current collector lead is joined to the first positive electrode current collector-exposed part, and a first half-line connecting the winding axis and the center of the positive electrode current collector lead does not coincide with a second half-line connecting the winding axis and the center between the outer peripheral side terminal part of the negative electrode active material layer of the negative electrode plate and the outer peripheral side terminal part of the positive electrode plate.

According to an aspect of the present invention, it is possible to enhance the circularity on a half-line connecting the electrode body axis, on which stress is most concentrated by expansion and contraction of an electrode body, and the center of a positive electrode current collector lead and to relieve the concentration of stress of a step difference of a wrap tape. Therefore, even when a charge-discharge cycle is repeated, the formation of a crack in an electrode body can be suppressed.

DESCRIPTION OF EMBODIMENTS

Modes for carrying out the present invention are described in detail with reference to the drawings. The present invention is not limited to embodiments described below and can be carried out by appropriate change within the range in which the gist is not changed.

Figure 1:
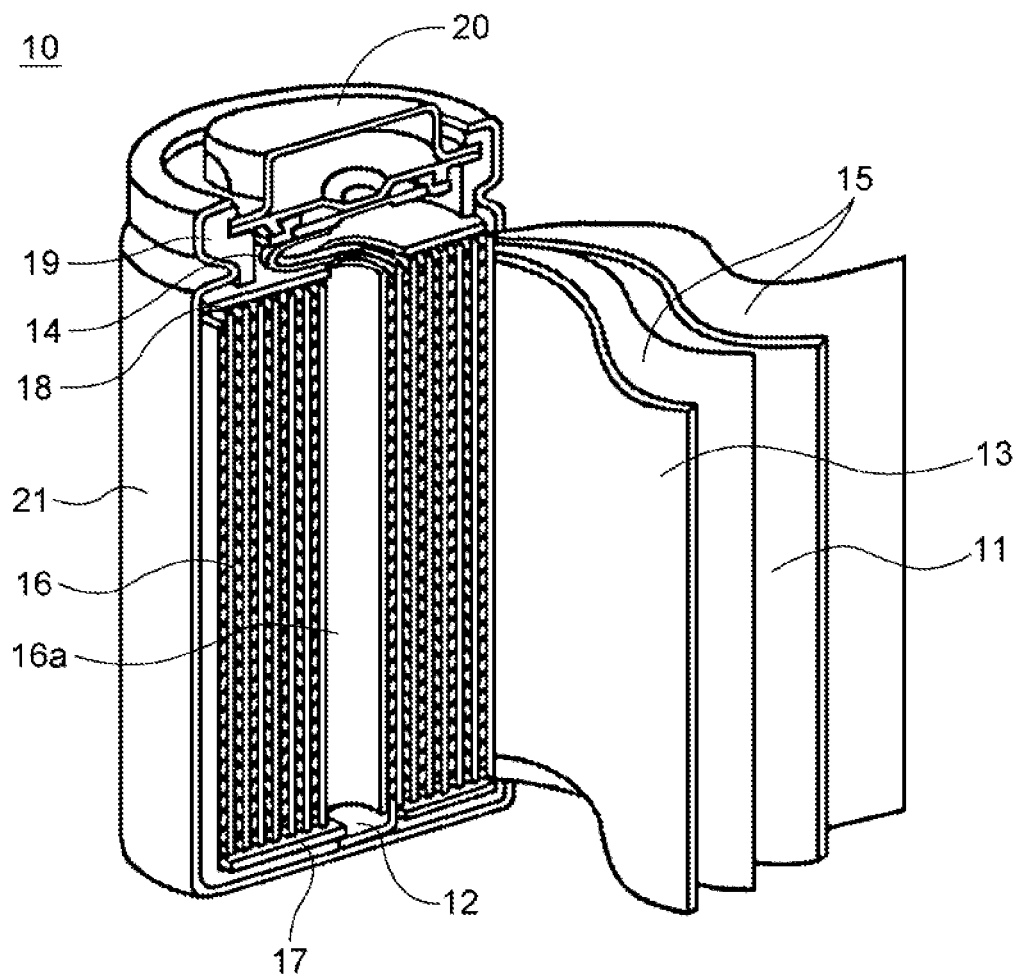
FIG. 1 is a sectional perspective view of a nonaqueous electrolyte secondary battery according to an embodiment of the present invention.

FIG. 1 is a sectional perspective view of a nonaqueous electrolyte secondary battery 10 according to an embodiment of the present invention. An electrode body 16 and a nonaqueous electrolyte are housed in a bottomed cylindrical battery case 21. A sealing body 20 is fixed by caulking to a grooved part, which is formed near an opening of the battery case 21, through a gasket 19, thereby sealing the inside of the battery.

Figure 2:
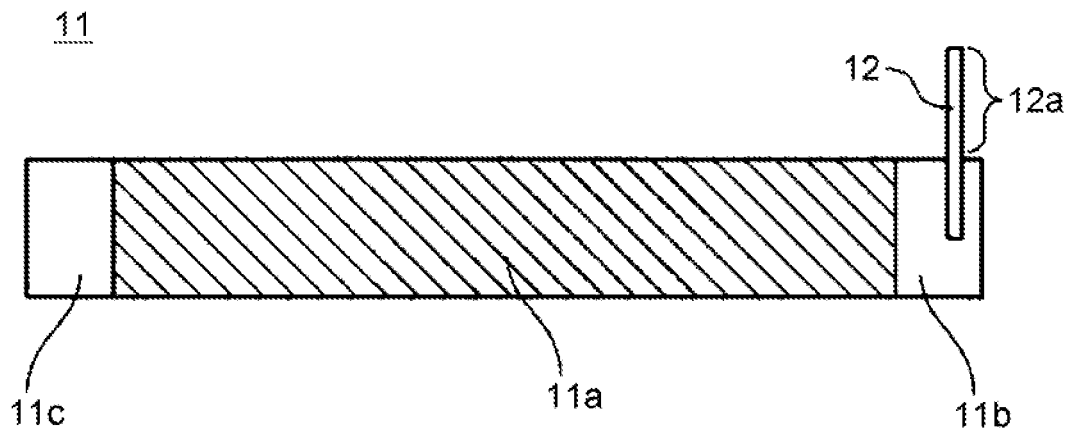
FIG. 2 is a plan view of a negative electrode plate of a nonaqueous electrolyte secondary battery according to an embodiment of the present invention.

As shown in FIG. 2, a negative electrode plate 11 has a negative electrode active material layer 11a formed on a negative electrode current collector. The negative electrode active material layer 11a may be formed on at least one of the surfaces of the negative electrode current collector. A negative electrode current collector-exposed part, where the negative electrode active material layer 11a is not formed on both surfaces of the negative electrode current collector, is provided at each of both ends in the length direction of the negative electrode plate 11. In forming the electrode body 16, the negative electrode plate 11 and a positive electrode plate 13 are wound along the length direction, and thus the negative electrode current collector-exposed part is disposed at each of the inner peripheral-side end and the outer peripheral-side end of the electrode body. Herein, the negative electrode current collector-exposed part on the inner peripheral side is referred to as the "first negative electrode current collector-exposed part 11b", and the negative electrode current collector-exposed part on the outer peripheral side is referred to as the "second negative electrode current collector-exposed part 11c". A negative electrode current collector lead 12 is joined to the first negative electrode current collector-exposed part 11b. Examples of a joint method include welding methods such as resistance welding, ultrasonic welding, and laser welding, and the like, and a piercing method.

The negative electrode active material layer 11a can be formed by applying and drying a negative electrode mixture slurry, prepared by kneading a negative electrode active material and a binder in a dispersion medium, on the negative electrode current collector. After drying, the negative electrode active material layer 11a is preferably compressed by a roller so that a predetermined thickness is obtained. Compressing the negative electrode active material layer 11a can improve the energy density of the nonaqueous electrolyte secondary battery.

A carbon material which can reversibly absorb and release lithium ions, and a metal material which can be alloyed with lithium can be used as the negative electrode active material. Examples of the carbon material include graphite such as natural graphite, artificial graphite, and the like. Examples of the metal material include silicon and tin, and oxides thereof. The carbon materials and metal materials can be used alone or as a mixture of two or more. Also, when the negative electrode active material containing an oxide of silicon or tin having a large volume change associated with charge-discharge is used, the effect of the present invention can be clearly obtained.

Usable examples of negative electrode current collector include metal foils made of copper, a copper alloy, nickel, a nickel alloy, and stainless steel. Among these, metal foils made of copper and a copper alloy are preferred. Also, a metal plate composed of a metal exemplified as the negative electrode current collector is preferably used as the negative electrode current collector lead 12.

The positive electrode plate 13 has a positive electrode active material layer formed on a positive electrode current collector. The positive electrode active material layer may be formed on at least one of the surfaces of the positive electrode current collector. A positive electrode current collector-exposed part is provided on at least a part of the positive electrode plate 13. In the positive electrode current collector-exposed part, a positive electrode current collector lead 14 is joined to the positive electrode current collector-exposed part. Examples of a joint method include welding methods such as resistance welding, ultrasonic welding, and laser welding, and the like, and a piercing method.

The positive electrode current collector-exposed part is formed in a region (for example, a position at a distance of 20% or more of the length of the positive electrode current collector from either end) other than the ends of the positive electrode current collector in the winding direction. Thus, the resistance is decreased. In this case, the positive electrode current collector lead projects from the internal region of the wound electrode group. The internal region is the combined region which, in a sectional view vertical to the axial direction of the wound electrode group, includes a region on the outermost peripheral side from the center circle located at the center between the innermost periphery and the outermost periphery to a distance of 30% of the distance between the innermost periphery and the outermost periphery, and a region on the innermost peripheral side from the center circle to a distance of 30% the distance between the innermost periphery and the outermost periphery. In other words, the positive electrode current collector-exposed part is disposed so that the positive electrode current collector lead projects from the internal region.

An insulation tape is preferably attached on the positive electrode current collector lead and on the back surface of the positive electrode current collector to which the positive electrode current collector lead is joined. This can prevent internal short-circuit caused by the positive electrode current collector lead.

The positive electrode active material layer can be formed by applying and drying a positive electrode mixture slurry, prepared by kneading a positive electrode active material, a conductive agent, and a binder in a dispersion medium, on the positive electrode current collector. After drying, the positive electrode active material layer is preferably compressed by a roller so that a predetermined thickness is obtained. Compressing the positive electrode active material layer can improve the energy density of the nonaqueous electrolyte secondary battery.

A lithium transition metal composite oxide which can reversibly absorb and release lithium ions can be used as the positive electrode active material. Examples of the lithium transition metal composite oxide include the general formula $LiMO_2$ (M is at least one of Co, Ni, and Mn), $LiMn_2O_4$, and $LiFePO_4$. These can be used alone or as a mixture of two or more. It is also possible to use a lithium transition metal composite oxide in which at least one selected from the group consisting of Al, Ti, Mg, and Zr is added or is substituted for a transition metal element.

Usable examples of the positive electrode current collector include metal foils made of aluminum, an aluminum alloy, nickel, a nickel alloy, and stainless steel. Among these, metal foils made of aluminum and an aluminum alloy are preferred. Also, a metal plate composed of a metal exemplified as the positive electrode current collector is preferably used as the positive electrode current collector lead.

The electrode body 16 is formed by winding the negative electrode plate 11 and the positive electrode plate 13 through a separator 15 and fixing the upper part and the lower part of the electrode body with a wrap tape. The negative electrode plate 11 is wound so as to start winding from the end on the side to which the negative electrode current collector lead 12 is welded, and the negative electrode current collector lead 12 projects downward from the electrode body, and the positive electrode current collector lead 14 projects upward from the electrode body.

Figure 3:
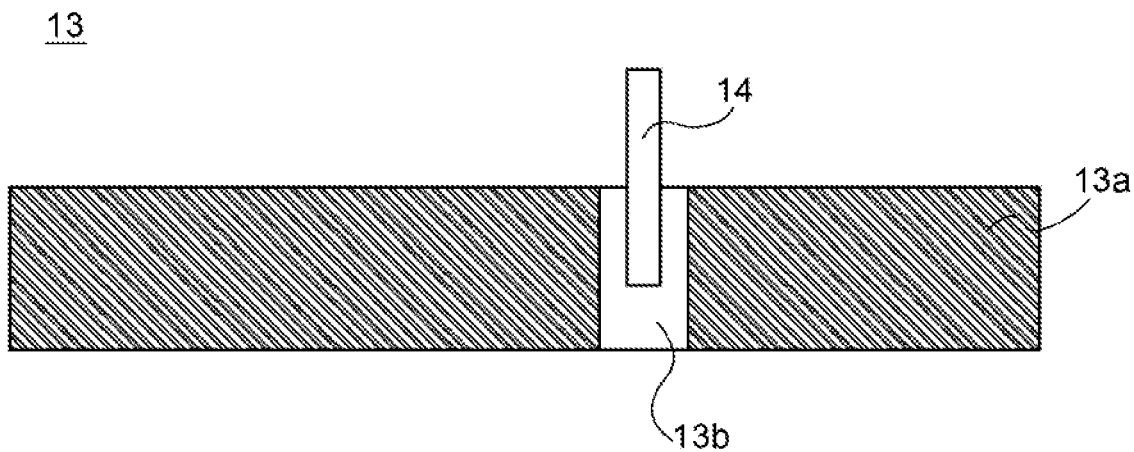
FIG. 3 is a plan view of a positive electrode of a nonaqueous electrolyte secondary battery according to an embodiment of the present invention.
Figure 4:
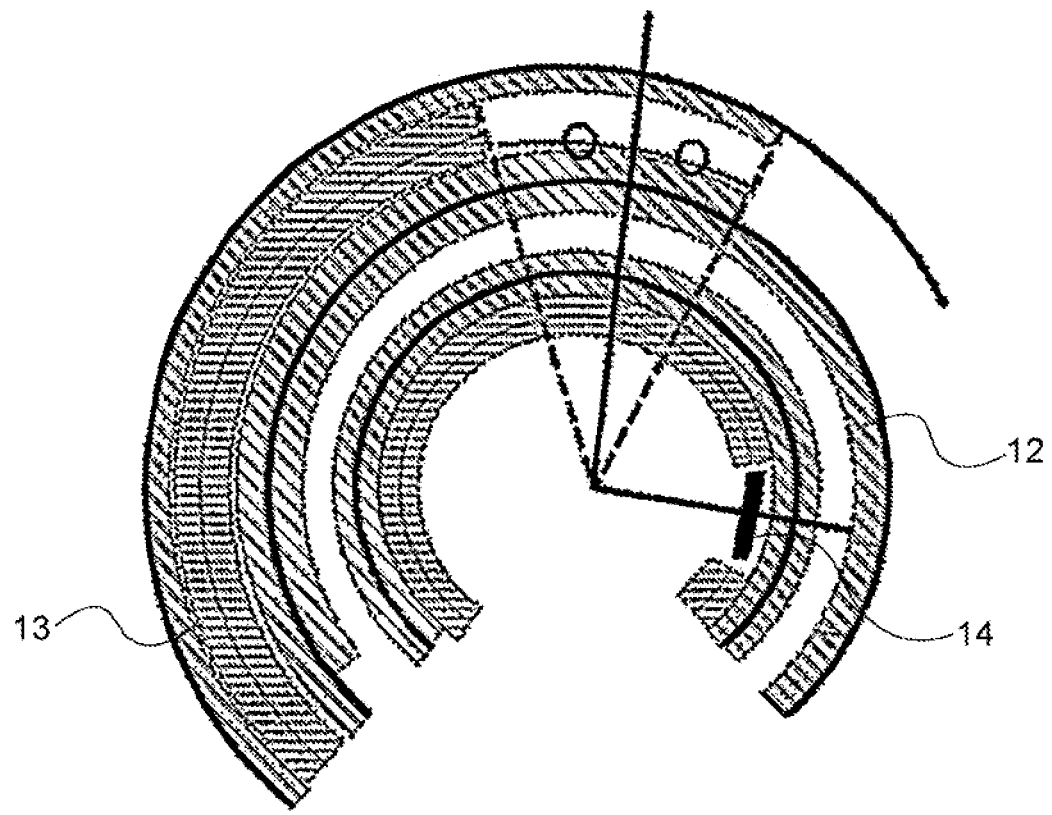
FIG. 4 is a sectional view of an electrode body of a nonaqueous electrolyte secondary battery according to an embodiment of the present invention.

FIG. 3 shows the winding stop end of the positive electrode 13 and the coating end of the negative electrode. In the electrode body 16, the negative electrode 11 is wound so as to be formed in the outermost periphery and faces the positive electrode plate through the separator.

The negative electrode 11 has the negative electrode active material layer 11a formed on each of the inner peripheral surface and the outer peripheral surface of the negative electrode current collector. The coating ends of the negative electrode active material layers 11a on the inner peripheral surface and the outer peripheral surface are different from each other, and the coating end of the negative electrode active material layer on the inner peripheral surface side is terminated at the outer side of the negative electrode active material layer on the outer peripheral surface side. The negative electrode current collector is further extended and wound at least one turn around the electrode body, and is terminated.

The positive electrode 13 has the positive electrode active material layer 13a formed on each of the inner periphery and the outer periphery of the positive electrode current collector. The coating ends of the positive electrode active material layers 13a on the inner peripheral surface and the outer peripheral surface are at substantially the same position, and the positive electrode current collector is terminated at substantially the same position.

In this case, the negative electrode active material layer 11a, the positive electrode 13, and the positive electrode current collector lead 14 are disposed so that a half-line (second half-line) connecting the center, between the coating end (that is, the coating end on the inner peripheral side) of the negative electrode active material layer 11a on the outermost peripheral side, and the terminating part of the positive electrode plate and the winding axis does not coincide with a half-line (first half-line) connecting the central part of the positive electrode current collector lead and the winding axis. This disposition can dispose the outermost periphery of the electrode body with high circularity in the direction of the half-line connecting the winding axis, where expansion-contraction stress is most applied by charge-discharge, and the positive electrode current collector lead 14, and thus a crack or the like in the active material layer due to cycles can be suppressed.

The angle formed by the first half-line and the second half-line is, for example, 20 degrees or more and 160 degrees or less, preferably 30 degrees or more and 150 degrees or less, more preferably 70 degrees or more and 110 degrees or less, and particularly preferably 85 degrees or more and 95 degrees or less.

It is also preferred that the first half-line is not located between the angle formed by the half-line connecting the terminal part of the positive electrode 13 and the axial center and the half-line connecting the terminal part of the negative electrode active material layer 11a and the axial center. In other words, both the positive electrode end and the negative electrode active material layer end are disposed in either of the regions divided by a line connecting the winding axis and the center of the positive electrode current collector lead.

The length from the terminal part of the positive electrode 13 to the terminal part of the negative electrode active material layer 11a is, for example, 4 mm or more and is preferably 7 mm or more.

In addition, in a plane vertical to the winding axis of the electrode body 16, during discharge, the ratio (outer diameter of the electrode body 16/outer diameter of the battery case 21) of the outer diameter of the electrode body 16 to the outer diameter of the battery case 21 is preferably 0.97 or more particularly from the viewpoint of increasing the energy density. Also, in order to insert the relatively large electrode body 16, the terminal part of the positive electrode 13, the terminal part of the negative electrode active material layer 11a, and the position of the positive electrode current collector lead 14 are appropriately disposed as described above, and thus the circularity of the electrode body can be enhanced. The circularity of the electrode body is preferably 0.98 or more.

The bottomed cylindrical battery case 21 can be formed by, for example, drawing a metal plate. Examples of a metal which can be used for the metal plate include iron, nickel, and stainless. In the case of use of iron, the surface thereof is preferably plated with nickel.

A microporous film composed of polyolefin as a main component, such as polyethylene (PE), polypropylene (PP), or the like, can be used as the separator 15. A single-layer microporous film or a laminated microporous film having two or more layers can be used. A laminated separator containing two or more layers preferably contains a layer, as an intermediate layer, containing polyethylene (PE) with a low melting point, and a surface layer containing polypropylene (PP) with excellent oxidation resistance. In addition, inorganic particles of aluminum oxide ($Al_2O_3$), titanium oxide ($TiO_2$), or silicon oxide ($SiO_2$) can be added to the separator. Such inorganic particles can be supported in the separator and can also be applied together with the binder on the surface of the separator. Also, an aramid-based resin can be applied on the surface of the separator.

The nonaqueous electrolyte prepared by dissolving a lithium salt as an electrolyte salt in a nonaqueous solvent can be used.

Usable examples of the nonaqueous solvent include cyclic carbonate esters, chain carbonate esters, cyclic carboxylate esters, and chain carboxylate esters, and these can be preferably used as a mixture of two or more. Examples of cyclic carbonate esters include ethylene carbonate (EC), propylene carbonate (PC), and butylene carbonate (BC). Also, a cyclic carbonate ester, such as fluoroethylene carbonate (FEC), in which hydrogens are partially substituted by fluorine, can be used. Examples of chain carbonate esters include dimethyl carbonate (DMC), ethylmethyl carbonate (EMC), diethyl carbonate (DEC), methylpropyl carbonate (MPC), and the like. Examples of cyclic carboxylate esters include γ-butyrolactone (γ-BL) and γ-valerolactone (γ-VL), and examples of chain carboxylate esters include methyl acetate (MA), methyl pivalate, ethyl pivalate, methyl isobutyrate, and methyl propionate.

Examples of a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Among these, $LiPF_6$ is preferred, and the concentration in a nonaqueous electrolytic solution is preferably 0.5 to 2.0 mol/L. Also, $LiPF_6$ can be mixed with another lithium salt such as $LiBF_4$ or the like.

EXAMPLES

An embodiment of the present invention is described in further detail below by using specific examples.

Example 1

(Formation of Negative Electrode Plate)

Graphite used as a negative electrode active material was mixed with SiO at 95:5, and further mixed with 1.5 parts by mass of carboxymethyl cellulose (CMC) used as a thickener and 1.5 parts by mass of styrene butadiene rubber used as a binder. The resultant mixture was poured into water used as a dispersion medium and kneaded to prepare a negative electrode mixture slurry. The negative electrode mixture slurry was applied by a doctor blade method on both surfaces of a negative electrode current collector made of copper and having a thickness of 8 μm and dried to form negative electrode active material layers 11a. In this case, a first negative electrode current collector-exposed part 11b and a second negative electrode current collector-exposed part 11c were provided at positions corresponding to respective both ends in the length direction of the completed negative electrode plate 11. Next, the negative electrode active material layers 11a were compressed by a roller, and the compressed electrode plate was cut into a predetermined size. Finally, a negative electrode current collector lead 12 was joined to the first negative electrode current collector-exposed part 11b by ultrasonic welding, thereby forming a negative electrode plate 11 shown in FIG. 2.

(Formation of Positive Electrode Plate)

Mixed were 100 parts by mass of $LiNi_{0.82}CO_{0.15}Al_{0.03}O_2$ used as a positive electrode active material, 1 part by mass of acetylene black used as a conductive agent, and 0.9 parts by mass of polyvinylidene fluoride (PVDF) used as a binder. The resultant mixture was poured into N-methyl-2-pyrrolidone (NMP) used as a dispersion medium and kneaded to prepare a positive electrode mixture slurry. The positive electrode mixture slurry was applied by a doctor blade method on both surfaces of a positive electrode current collector made of aluminum and having a thickness of 15 μm and dried to form positive electrode active material layers. In this case, a positive electrode current collector-exposed part was provided at a position corresponding to the center of the completed positive electrode plate 13. Next, the positive electrode active material layers were compressed by a roller, and the compressed electrode plate was cut into a predetermined size. Finally, a positive electrode current collector lead 14 was joined to the positive electrode current collector-exposed part by ultrasonic welding, thereby forming a positive electrode plate 13.

(Formation of Electrode Body)

An electrode body was formed by winding the negative electrode plate 11 and the positive electrode plate 13 through a separator 15 made of a polyethylene-made microporous film. In forming the electrode body 16, the first negative electrode current collector-exposed part 11b was disposed on the inner peripheral side of the electrode body 16, and the second negative electrode current collector-exposed part 11b was disposed on the outer peripheral side of the electrode body 16. Further, the length of the separator was adjusted so that the second negative electrode current collector-exposed part 11c was disposed in the outermost peripheral part of the electrode body 16. Each of upper and lower parts of the electrode body 16 was fixed by a winding stop tape.

(Preparation of Nonaqueous Electrolyte)

Ethylene carbonate (EC) and dimethyl carbonate (DMC) were mixed at a volume ratio of 30:70 (1 atm, 25° C.) to prepare a nonaqueous solvent. Lithium hexafluorophosphate (LiPF6) serving as an electrolyte salt was dissolved at a concentration of 1 mol/L in the resultant nonaqueous solvent, preparing a nonaqueous electrolyte.

(Formation of Nonaqueous Electrolyte Secondary Battery)

A ring-shaped insulation plate 17 was attached to the lower end surface of the electrode body 16. In this case, a projection 12a of the negative electrode current collector lead 12, which projected from the end surface of the electrode body 16, was inserted into an opening of the insulation plate 17. Then, as shown in FIG. 3, the projection 12a of the negative electrode current collector lead 12 was bent along the end surface of the electrode body 16 and the outer peripheral side surface of the electrode body 16, and then the electrode body 16 was inserted from an opening of a bottomed cylindrical battery case 21. In addition, the negative electrode current collector lead 12 was joined by welding to the bottom of the battery case 21.

Next, an insulation plate 18 was disposed on the upper part of the electrode body 16, and the outer surface near the opening of the battery case 21 was grooved by pressing a rotating disk. Then, a gasket 19 was disposed in the grooved part, and the positive electrode current collector lead 14 was connected to a sealing body 20. Then, the nonaqueous electrolyte was injected into the battery case 21, and then the sealing body 20 was fixed by caulking to the grooved part of the battery case through the gasket 19, thereby forming a cylindrical nonaqueous electrolyte secondary battery 10 shown in FIG. 1.

In Example 1, the distance between the positive electrode end and the negative electrode active material layer end was 5 mm, and the angle between a first half-line and a second half-line was 30 degrees. In addition, the battery size was that of so-called 18650 cell, and the capacity was 2.6 Ah.

Examples 2 to 8

Batteries were formed by the same method as in Example 1 except that the distance between the positive electrode end and the negative electrode active material layer end and the angle between the first half-line and the second half-line were as shown in Table 1.

Comparative Example 1

A battery was formed by the same method as in Example 1 except that the angle between the first half-line and the second half-line was 0 degree, that is, both half-lines coincided with each other.

(Cycle Evaluation)

Each of the batteries of Examples 1 to 8 and Comparative Example 1 was formed, and each of the batteries was charged at a constant current of 1.0 It until the voltage was 4.2 V and further charged at a constant voltage of 4.2 V until the current was 0.02 It. After rest for 20 minutes, each of the batteries was discharged at a constant current of 1.0 It until the voltage was 2.5 V. This cycle was performed 500 cycles in an environment of 45° C., and the cycle retention rate was measured. The capacity retention rate at the 500th cycle relative to the initial capacity was regarded as the cycle retention rate.

TABLE 1

| | Distance between positive electrode terminal part and negative electrode mixture terminal part | Angle formed by first half-line and second half-line | Cycle retention rate |
|---|---|---|---|
| Example 1 | 7 mm | 30° | 75% |
| Example 2 | 7 mm | 60° | 80% |
| Example 3 | 7 mm | 90° | 88% |
| Example 4 | 7 mm | 150° | 74% |
| Example 5 | 7 mm | 20° | 70% |
| Example 6 | 7 mm | 160° | 72% |
| Example 7 | 10 mm | 30° | 80% |
| Example 8 | mm | 90° | 80% |
| Comparative Example 1 | 7 mm | 0° | 56% |

From comparison between the results of Examples 1 to 8 and Comparative Example 1, it could be confirmed that when the first half-line is deviated so as not to coincide with the second half-line, the cycle characteristics are improved. Further, it could be confirmed that Example 3 exhibits the most excellent cycle characteristics. That is, it was found that the closer to 90 degrees the angle is, the better the obtained result becomes.

Next, from comparison between Example 1 and Example 7 and between Example 3 and Example 8, it could be confirmed that the more excellent cycle characteristics are exhibited by increasing the distance between the positive electrode terminal and the negative electrode mixture terminal part.

INDUSTRIAL APPLICABILITY

According to the present invention, a nonaqueous electrolyte secondary battery having excellent cycle characteristics can be provided. Therefore, the present invention has the high possibility of industrial use.

REFERENCE SIGNS LIST

10 nonaqueous electrolyte secondary battery
11 negative electrode plate
11a negative electrode active material layer
11b first negative electrode current collector-exposed part
11c second negative electrode current collector-exposed part
12 negative electrode current collector lead
12a projection
13 positive electrode plate
14 positive electrode current collector lead
15 separator
16 electrode body
17 insulation plate
18 insulation plate
19 gasket
20 sealing body
21 battery case

The invention claimed is:

1. A nonaqueous electrolyte secondary battery comprising:
an electrode body formed by winding a negative electrode plate and a positive electrode plate through a separator and fixed at the upper part and the lower part by a wrap tape;
a nonaqueous electrolyte;
a bottomed cylindrical battery case which houses the electrode body and the nonaqueous electrolyte; and
a sealing body which seals an opening of the battery case,
wherein the negative electrode plate has a first negative electrode current collector-exposed part and a second negative electrode current collector-exposed part where negative electrode active material layers are not formed at the inner peripheral side end and the outer peripheral side end, respectively, in the winding direction;
a negative electrode current collector lead is joined to the first negative electrode current collector-expose portion, and at least a part of the second negative electrode current collector-exposed part is in contact with the inner wall of the battery case;
the positive electrode plate has a first positive electrode current collector-exposed part where a positive electrode active material layer is not formed in a part on the outer peripheral side of the negative electrode current collector lead;
a positive electrode current collector lead is joined to the first positive electrode current collector-exposed part; and
in a plane vertical to the winding axis of the electrode body, a first half-line connecting the winding axis and the center of the positive electrode current collector lead does not coincide with a second half-line connecting the winding axis and the center between the outer peripheral-side terminal part of the negative electrode active material layer of the negative electrode plate and the outer peripheral-side terminal part of the positive electrode plate.

2. The nonaqueous electrolyte secondary battery according to claim 1, wherein the angle formed by the first half-line and the second half-line is 20 to 160°.

3. The nonaqueous electrolyte secondary battery according to claim 1, wherein in a plane vertical to the winding axis of the electrode body, during discharge, the ratio (outer diameter of the electrode body/outer diameter of the battery case) of the outer diameter of the electrode body to the outer diameter of the battery case is 0.97 or more.

4. The nonaqueous electrolyte secondary battery according to claim 1, wherein in a plane vertical to the winding axis of the electrode body, the circularity of the electrode body is 0.98 or more.

5. The nonaqueous electrolyte secondary battery according to claim 1, wherein the length from the terminal part of the positive electrode plate to the outer peripheral-side terminal part of the negative electrode active material layer is 4 mm or more.

6. The nonaqueous electrolyte secondary battery according to claim 1, wherein the terminal part of the positive electrode and the outer peripheral-side terminal part of the negative electrode active material layer are disposed in only one of the regions divided by a line connecting the winding axis and the center of the positive electrode current collector lead.

\* \* \* \* \*